April 16, 1946. F. J. WENZEL 2,398,733
BRAKING MECHANISM FOR FILM REEL-SUPPORTING SHAFTS
Filed May 23, 1945
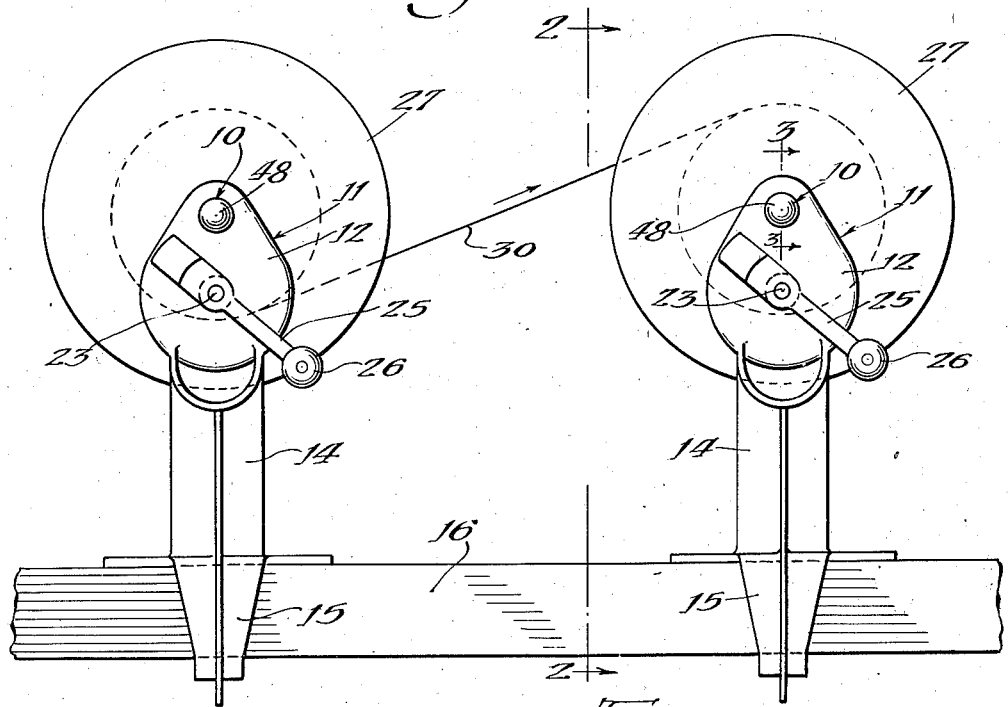
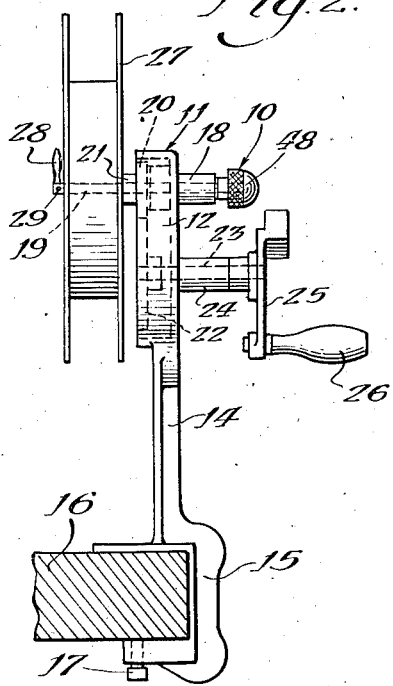
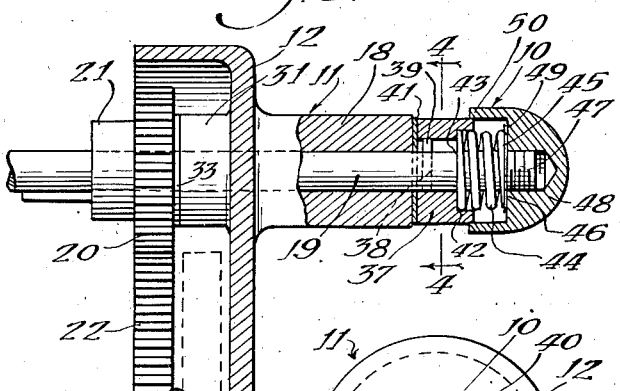
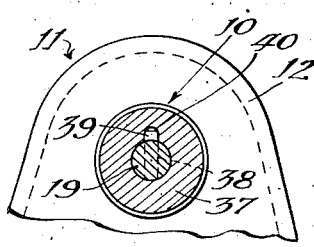
Inventor:
Fred J. Wenzel
By Wallace and Cannon
Attorneys Patented Apr. 16, 1946

2,398,733

UNITED STATES PATENT OFFICE 2,398,733

BRAKING MECHANISM FOR FILM REEL-SUPPORTING SHAFTS

Fred J. Wenzel, Chicago, Ill.

Application May 23, 1945, Serial No. 595,306

1 Claim. (Cl. 188—83)

This invention relates to a braking mechanism for a motion picture film reel supporting shaft and is intended for use with film-rewinding devices, upon the reel-supporting shafts of motion picture projectors and the like.

In the use of motion picture films it is frequently necessary to rewind the film from a feed reel onto a take-up reel so as to place the ends of the film in proper position for rerunning.

It is frequently desirable, in the use of such film-rewinding devices, to vary the speed at which the feed reel and the take-up reel will revolve during the film-rewinding operation so as to prevent the two reels from running either too fast or too slow and also to permit the film to be examined for possible breaks or tears during the film-rewinding operation.

Some attempts have been made heretofore to use braking mechanisms upon certain film-rewinding devices but these have been subject to various objections either because of being too complicated or too expensive to manufacture or because the parts thereof tended to work loose during the use of the film-rewinding devices with which such braking devices have been used. Moreover, such prior devices have, in general, been limited to use at the so-called "dead" or dummy unit of a pair of film-rewinding devices and generally required that they be locked in effective or braking position.

An object of the present invention is to provide a new and improved film rewinding device embodying as an integral part thereof a braking mechanism which is simple and inexpensive in construction, easy to operate, which does not require that it be locked in effective or braking position, in order to perform the desired braking operation, which will not work loose during the rotation of the reel-supporting shaft of the film-rewinding device in conjunction with which it is employed, and which may be used upon either the dummy unit or end or the "live" unit or end of a pair of film-rewinding devices.

Other and further objects of the present invention will be apparent from the following description and claim and are illustrated in the accompanying drawing which, by way of illustration, shows a preferred embodiment of the invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

Fig. 1 is a side elevational view illustrating a pair of film-rewinding devices arranged in a typical manner in which such film-rewinding devices are used and illustrating a typical embodiment of the present invention associated with each of said film-rewinding devices;

Fig. 2 is a side elevational view on line 2—2 in Fig. 1;

Fig. 3 is an enlarged fragmentary sectional view on line 3—3 in Fig. 1; and

Fig. 4 is a sectional detail view on line 4—4 in Fig. 1.

A preferred and typical embodiment of the new braking mechanism for a film-rewinding device is shown in the drawing, and particularly in Figs. 2, 3 and 4, wherein it is generally indicated at 10, and is shown as being associated with each of a pair of similar film-rewinding devices 11. One of said film-rewinding devices or units 11, namely, the one at the right hand end in Fig. 1, is commonly referred to in the art as the "live" end or unit and the other or left-hand unit is commonly referred to as the "dead" or dummy end or unit. The present invention is shown as being associated with each of said units but it may, if desired, be associated with or embodied in only one of the same. However, since the construction of the new braking device which is embodied in both of the film-rewinding devices shown in the drawing is the same only one of the same will be described in detail hereinafter.

Each of the film-rewinding devices 11 is shown as being of the hand-operated type but the same may, within the scope of the present invention, also be of the motor-driven type. While both of the film-rewinding devices shown are of the same construction they may be different in construction and one may be of the so-called "dummy" type, that is, without a handle or crank.

Each of the film-rewinding devices 11 shown in the drawing comprises a casing 12 which is mounted upon a supporting standard 14 and each supporting standard 14 has a clamping jaw 15 formed thereon at its lower end so that the film-rewinding device 11 may be clamped in position of use upon a work table 16, or the like, by manipulating a clamping screw 17 which is carried by the clamping jaw 15.

Each of the film-rewinding devices 11 includes a bearing or journal portion or boss 18, which is formed integral with the housing 12, on the outer side thereof, and a boss 31 formed integral with the housing 12 on the inner side thereof. A film reel-supporting shaft 19 has a gear 20 mounted thereon, within the housing 12, and this gear 20 is keyed or otherwise fastened to the shaft 19 in any suitable manner. A flexible gasket 33 is arranged upon the shaft 19 between the gear 20 and the boss 31. The gear 20 has a boss 21 formed thereon at one side thereof. The gear 20 meshes with a gear 22 and the gear 22 is carried by a shaft 23 which is journaled in a bearing portion or boss 24 formed integral with the housing 12 below the bearing portion or boss 18, as shown in Fig. 2. A crank 25 is attached to the shaft 23 and is provided with a handle portion 26.

A suitable film reel as 27 may be mounted upon each of the shafts 19, for rotation therewith, and is retained thereon by means of a latch finger 28 one of which is pivotally mounted at 29 on each of the shafts 19 at the axially outer end of the latter.

As illustrated in the drawing, a motion picture film 30 extends between and is adapted to be selectively wound upon and unwound from the reels 27.

The parts and construction thus far described have been known and used heretofore in the art of film rewinding devices and the present invention, as associated therewith, will now be described.

The present invention provides a novel braking mechanism which may be employed in conjunction with the film reel-supporting shaft 19 of either of the film rewinding devices 11.

The new braking mechanism 10 includes an annular braking member or collar 37 which is arranged upon and is splined upon the reel-supporting shaft 19 by means of a key or pin 38 which is mounted in and extends through an opening in the shaft 19, as shown in Fig. 3, and which pin or key 39 has a portion which extends into a slot 40 in the collar 37 (Fig. 4). A flexible gasket 41 is preferably but not necessarily arranged upon the shaft 19 between the annular braking member or collar 37 and the adjacent end wall of the bearing boss 18.

An annular groove 42 is formed on the inner side of the annular braking member or collar 37 and one end convolution 43 of an expansion coil spring 44, which is arranged upon the shaft 19, projects into the annular groove 42 in the braking collar 37. The other end convolution 45 of the resilient element or coil spring 44 bears against a thin and preferably metallic disc or washer 46, which is arranged upon the reel-supporting shaft 19, as shown in Fig. 3.

As shown in Fig. 3, the outer end portion 47 of the reel-supporting shaft 19 is threaded and a knurled thumb nut 48 is threaded onto the said threaded outer end portion 47 of the reel-supporting shaft 19. The inner face 49 of the nut 48 bears against the thin metallic disc 46 and the nut 48 has an annular flange 50 which projects over and is slidable upon the outer surface of the annular braking collar 37.

In the use of the new film rewinding device, and the braking mechanism 10 embodied therein, the supporting standards 14—15—17 for the reels 27 may be clamped in position of use upon a work table 16, or other suitable supporting surface, and the reels 27 may be mounted upon their respective supporting shafts 19 in a manner which is well understood in the art. The film 30 may then be run off one reel and onto the other reel, by rotating the crank 25 and handle 26 of one of the film-rewinding devices or units 11. This movement of the crank 25 and handle 26 operates through the shaft 23, gear 22, and gear 20 to rotate the reel-supporting shaft 19 and the reel 27 carried thereby.

As is well understood in the art, the reel 27 onto which the film is being wound will tend to acquire momentum and to run relatively fast as the film 30 is wound thereon, and as this operation progresses it is often desirable to exert a braking action on the reel-supporting shaft 19 of the unit or device 11 on which the then take-up reel is mounted so as to slow down the speed of rotation of the then take-up reel 27. This is particularly desirable in those instances in which it is desired to examine the film 30 for possible breaks or tears as the film is transferred from one reel to the other.

In order to accomplish this result it is merely necessary for the operator to rotate the knurled thumb nut 48 in a clockwise direction, as seen in Fig. 1. This movement of the nut 48 threads the same axially inwardly on the threaded axially outer end portion 47 of the reel-supporting shaft 19. This causes the nut 48 to push inwardly on the thin metal disc 46, thus compressing the resilient element or coil spring 44, which, in turn, bears against the braking collar 37, at the shoulder formed therein by the annular groove 42 (Fig. 3). This action forces the axially inner end of the annular braking collar 37 against the disc or gasket 41 and thus brakes the rotation of the shaft 19 and the reel 27 carried thereby.

It will be noted that when the knurled thumb nut 48 is thus rotated to compress the resilient element or coil spring 44, and thereby exert a braking action on the braking collar 37, the annular flange 50 of the nut 48 slides over the outer surface of the annular braking collar 37.

When it is desired to relieve or reduce the braking action of the collar 37 this may be accomplished by rotating the nut 48 upon and relative to the shaft 19 in a direction opposite to that described above or, in other words, in a counter-clockwise direction, as seen in Fig. 1.

It will be noted that in the use of the new braking mechanism 10 all of the operating parts thereof, including the annular braking collar 37, the coil spring 44, the disc 46 and the manually adjustable nut 48, are mounted upon and rotate as a unit with the film reel-supporting shaft 19 and in the same direction of rotation as the film-reel supporting shaft 19 during rotation of the latter. Hence, there is no tendency for any of such parts to become loose relative to other parts of the braking mechanism due to rotation of the reel-supporting shaft 19 and no locking or latching device is necessary in order to hold the parts of the braking unit in effective or braking position. Thus one difficulty experienced in the use of prior braking mechanisms for and upon film-rewinding devices is eliminated.

It is sometimes desirable in the use of film-rewinding devices to reverse the direction of travel of the film during the film-rewinding operation so as to examine the film for breaks or tears therein or for other reasons and this may readily be done in the use of the film-rewinding devices 11 shown in the drawing and embodying the new braking units. During such usage the braking mechanisms on the film-rewinding devices 11 may be adjusted as desired.

The new braking mechanism 10 may be used in conjunction with the supporting shaft 19 for a film reel 27 of a film-rewinding device for commercial 35 mm. film and also for home use in conjunction with either 8 mm. or 16 mm. film.

Moreover, the new braking mechanism may also, if desired, be used in connection with or upon the film reel-supporting shafts of motion picture projectors, and in like or similar places or uses.

It will thus be seen from the foregoing description, considered in conjunction with the accompanying drawing, that the new braking mechanism for a film-rewinding device accomplishes its intended objects, and has the desirable advantages and characteristics, including those hereinbefore pointed out, and others which are inherent in the invention.

I claim:

In a braking mechanism for a motion picture film reel-supporting shaft, means providing a bearing support for rotatably supporting said film reel-supporting shaft, means for braking the rotation of said film reel-supporting shaft including a braking member mounted upon and rotatable with said film reel-supporting shaft and adapted to bear against said bearing support, and manually adjustable means carried by and rotatable with said film reel-supporting shaft for urging said annular braking member into braking arrangement with said bearing support, said braking member having the form of an annular braking collar fastened to said film reel-supporting shaft for rotation therewith, said braking mechanism including a coil spring arranged upon said reel-supporting shaft and having its axially inner end convolution bearing against said annular braking collar, said braking mechanism including a manually adjustable nut threaded onto an axially outer end portion of said film reel-supporting shaft for compressing said coil spring between said annular braking collar and said nut so as to vary the braking pressure of said annular braking collar upon the said bearing support, said nut including an annular flange portion projecting over the peripheral surface of said annular braking collar, said annular braking collar having an annular groove formed therein at its axially outer end providing an annular shoulder in the said annular braking collar, the axially inner end convolution of said coil spring being disposed in the said annular groove and being urged by the said nut into engagement with the said shoulder on the said annular braking collar, and the said braking mechanism including a flexible disc mounted upon the said film reel-supporting shaft between the said nut and the axially outer end convolution of said coil spring.

FRED J. WENZEL.